March 26, 1963 H. P. KAMIDE 3,083,284
ELECTRONIC COOKING APPARATUS
Filed Feb. 6, 1961 3 Sheets-Sheet 3

INVENTOR
HARRIS P. KAMIDE

ATTYS.

United States Patent Office 3,083,284
Patented Mar. 26, 1963

3,083,284
ELECTRONIC COOKING APPARATUS
Harris P. Kamide, Franklin Park, Ill., assignor to General Electric Company, a corporation of New York
Filed Feb. 6, 1961, Ser. No. 87,301
17 Claims. (Cl. 219—10.55)

The present invention relates to electronic cooking apparatus, and more particularly to such apparatus wherein the cooking effects are produced by electromagnetic wave energy in the ultra-high frequency band.

It is a general object of the invention to provide electronic cooking apparatus comprising fixed electronic equipment including an oscillator, and a portable cooking vessel, wherein the cooking vessel may be selectively connected and disconnected with respect to the fixed electronic equipment, so that electronic cooking operations may be carried out in the cooking vessel when it is connected to the fixed electronic equipment.

Another object of the invention is to provide electronic cooking apparatus of the character noted, and further comprising a first fixture connected to the fixed electronic equipment, a second fixture carried by the portable cooking vessel, the second fixture being selectively connectible and disconnectible with respect to the first fixture, and a valve included in the fixed electronic equipment and selectively controlled by the connection and by the disconnection of the second fixture with respect to the first fixture so that the valve is operated into its open position in response to connection of the second fixture to the first fixture and so that the valve is operated into its closed position in response to disconnection of the second fixture from the first fixture.

Another object of the invention is to provide electronic cooking apparatus of the character noted, and further comprising a first fixture connected to the fixed electronic equipment, a second fixture carried by the portable cooking vessel, the second fixture being selectively connectible and disconnectible with respect to the first fixture, and an electric control arrangement responsive to the connection of the second fixture to the first fixture for initiating operation of the oscillator incorporated in the fixed electronic equipment and responsive to disconnection of the second fixture from the first fixture for arresting operation of the oscillator.

A further object of the invention is to provide a portable cooking vessel for use in carrying out electronic cooking operations and comprising a metal pan provided with a side wall and having an open top, a removable metal cover for the open top of the pan, a tubular member carried by the side wall and surrounding an opening provided therein, the tubular member being adapted to serve as a conduit for supplying electromagnetic wave energy through the opening into the vessel, and a pane arranged in covering relation with the opening and sealed to the surrounding portion of the side wall so as to prevent the escape of food from the vessel into the tubular member, wherein the pane is formed of material that is highly transparent to electromagnetic wave energy to prevent substantial absorption or reflection of electromagnetic wave energy thereby.

A still further object of the invention is to provide a portable cooking vessel for use in carrying out electronic cooking operations and comprising an open top and provided with a removable cover, and incorporating a composite plug adapted to serve as a conduit for supplying electromagnetic wave energy into the vessel, wherein the composite plug is formed by complementary parts respectively carried by the pan and by the cover, so that the composite plug is completely formed only when the cover is assembled upon the pan in covering relation with respect to the open top thereof, and wherein the composite plug is selectively connectible and disconnectible with respect to a cooperating socket communicating with an associated wave guide.

Yet another object of the invention is to provide a cooking vessel of the character described, and further incorporating latching mechanism for preventing removal of the cover with respect to the open top of the pan when the composite plug mentioned occupies its inserted position with respect to the cooperating socket.

A still further object of the invention is to provide in electronic cooking apparatus including a portable cooking vessel, an improved and simplified circuit control arrangement for positively coordinating the operation of associated fixed electronic equipment with the selective connected and disconnected conditions of the cooking vessel with respect thereto.

Further features of the invention pertain to the particular arrangement of the elements of the cooking apparatus and of the electric control circuit therefor, whereby the above-outlined and additional operating features thereof are attained.

The invention, both as to its organization and method of operation, together with further objects and advantages thereof, will best be understood by reference to the following specification, taken in connection with the accompanying drawings, in which.

Figures 1, 3, 4, 6:
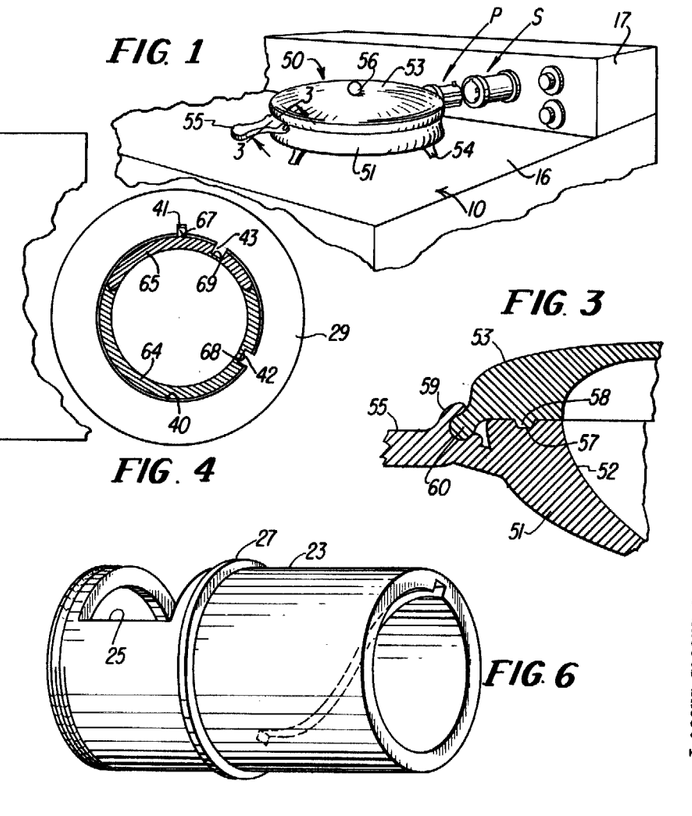
FIGURE 1 is a fragmentary top perspective view of electronic cooking apparatus embodying the present invention and including an electronic range and a portable cooking vessel that is adapted to be selectively connected and disconnected with respect to the range.
FIG. 3 is an enlarged fragmentary longitudinal sectional view of the front of the cooking vessel, this view being taken in the direction of the arrows along the line 3—3 in FIG. 1.
FIG. 4 is an enlarged lateral sectional view of the plug fixture carried by the cooking vessel, this view being taken in the direction of the arrows along the line 4—4 in FIG. 2.
FIG. 6 is an enlarged perspective view of the valve element incorporated in the valve mechanism, as shown in FIGS. 2 and 5.
Figure 2:
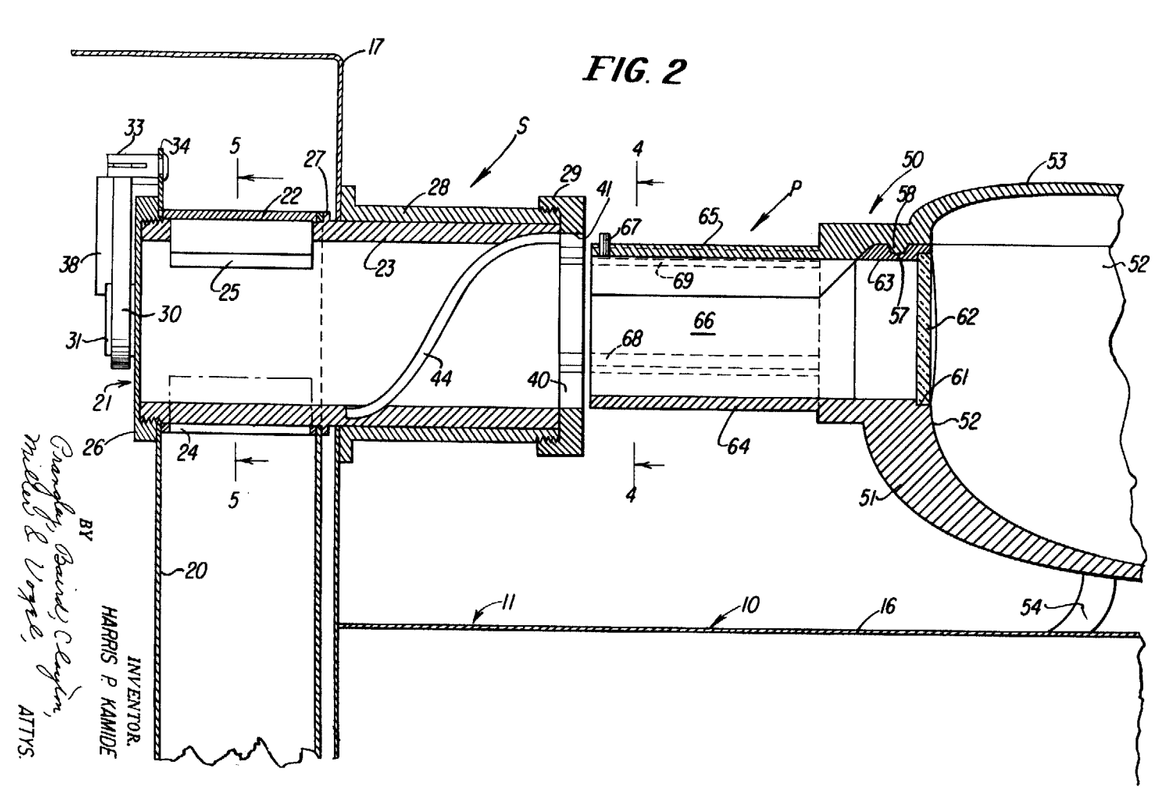
FIG. 2 is an enlarged fragmentary longitudinal sectional view, taken through the backsplash of the range and through the associated portable cooking vessel, the cooking vessel being illustrated in its disconnected position and in cooperating relation with respect to the associated front fixture carried by the backsplash of the range.
Figures 7, 8:
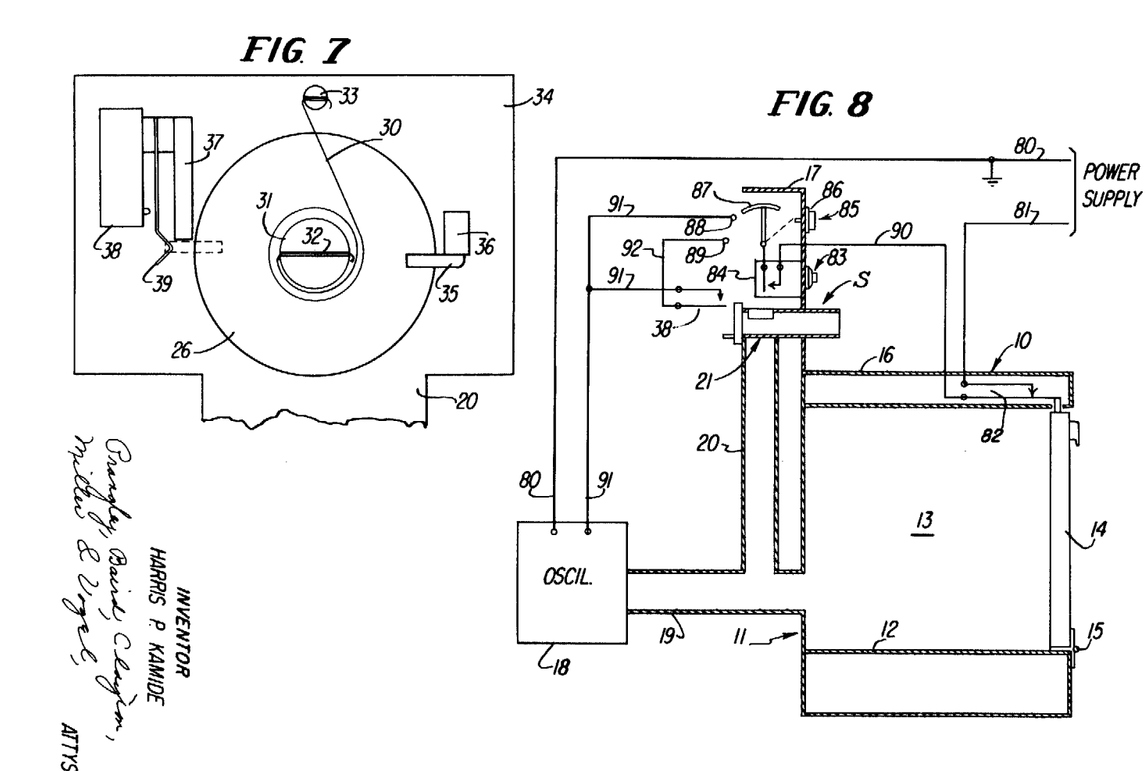
FIG. 7 is an enlarged fragmentary rear elevational view of the valve mechanism, as shown in FIG. 2.
FIG. 8 is a combined schematic view of the range and diagrammatic illustration of the electric control circuit therefor.

Referring now to FIGS. 1, 2 and 8 of the drawings, the cooking apparatus there illustrated and embodying the features of the present invention essentially comprises an electronic range 10 and a cooperating portable cooking vessel 50. The range 10 comprises a body 11 housing a metal liner 12 defining an oven cavity 13, the liner 12 providing a front access opening into the oven cavity 13. Also, the front of the body 11 carries a front door 14 that is operatively associated with the front access opening mentioned and that is selectively movable between open and closed positions with respect thereto, the lower edge of the front door 14 being suitably hinged to the lower front of the body 11, as indicated at 15. Also, the top of the body 11 carries a work top 16, and the top rear portion of the body 11 carries an upstanding backsplash 17 that is disposed adjacent to the rear of the work top 16.

Also, the range 10 comprises an oscillator 18 that is operative to produce electromagnetic wave energy in the ultra-high frequency band; which oscillator 18 may comprise a conventional magnetron and arranged to oscillate at a frequency of 2450 megacycles; whereby the oscillator 18 is operative to produce microwaves having a wave length of about 12 centimeters. The oscillator 18 is operatively connected to a metal wave guide 19 that communicates directly with the oven cavity 13 through an opening provided in the rear wall of the liner 12; and also the wave guide 19 is provided with an upstanding stub or branch 20 disposed behind the rear wall of the liner 12 and terminating below the top of the backsplash 17 that is employed for the purpose of supplying electromagnetic wave energy to the cooking vessel 50, as explained more fully hereinafter.

Referring now more particularly to FIGS. 1 to 4, inclusive, the portable cooking vessel 50 essentially comprises a metal pan 51 provided with a side wall 52 and having an open top, and a removable metal cover 53 for the open top of the pan 51. The bottom of the pan 51 carries a plurality of feet 54 that are adapted directly to engage the work top 16 so as to support the cooking vessel 50. The front of the pan 51 carries a forwardly projecting handle 55 to facilitate handling of the pan 51, and the top central portion of the cover 53 carries a knob 56 to facilitate placement and removal thereof with respect to the pan 51. The top edge of the side wall 52 of the pan 51 has an annular groove 57 formed therein that receives a complementary annular projection 58 provided upon the bottom edge of the cover 53, when the cover 53 occupies its assembled position upon the pan 51 in covering relation with respect to the open top thereof, as best shown in FIG. 3. The rear portion of the handle 55 carries a lock element 59 adjacent to the front of the side wall 52 of the pan 51; which lock element 59 removably receives a cooperating lock element 60 carried by the front of the cover 53; which cooperating lock elements 59 and 60 selectively restrain the cover 53 in assembled relation with respect to the pan 51. More particularly, while the cover 53 is removable with respect to the open top of the pan 51, the cover 53 must be hinged upwardly into an upstanding position about the front thereof with respect to the pan 51 in order to accommodate the removal of the lock element 60 with respect to the lock element 59; whereby the lock elements 59 and 60 also constitute a disconnectible hinge mechanism permitting the removal of the cover 53 from the pan 51 only when the cover 53 is hinged upwardly about the front thereof, as previously noted.

As best shown in FIG. 2, an opening 61 is formed in the rear portion of the side wall 52 adjacent to the upper portion thereof; which opening 61 is closed by an associated pane 62 that is sealed to the surrounding portion of the side wall 52 so as to prevent the escape of food from the pan 51 through the opening 61. The pane 62 is formed of material that is highly transparent to electromagnetic wave energy so as to prevent substantial absorption or reflection of electromagnetic wave energy thereby; which pane 62 may essentially comprise a suitable sheet of glass. Also, the rear of the side wall 52 of the pan 51 carries a first tubular member 63 surrounding the opening 61 and projecting rearwardly therefrom; which first tubular member 63 terminates in a further rearwardly projecting partial tube 64. Also, the rear of the cover 53 terminates in a rearwardly projecting partial tube 65 that cooperates with the partial tube 64 so as to define a composite second tubular member 66 when the cover 53 occupies its assembled position upon the top of the pan 51, as best shown in FIGS. 2 and 4.

Recapitulating: when the cover 53 occupies its assembled position upon the top of the pan 53, the second tubular member 66 is completely formed by the cooperating partial tubes 64 and 65 respectively carried adjacent to the rear of the pan 51 and adjacent to the rear of the cover 53; which completely formed second tubular member 66 directly communicates with the first tubular member 63 carried by the rear of the pan 51 and disposed immediately rearwardly of the adjacent pane 62. Moreover, the extreme rear end of the completely formed second tubular member 66 is open; whereby a composite conduit for the supply of electromagnetic wave energy to the cooking vessel 50 is defined by the completely formed second tubular member 66 and the communicating first tubular member 63 and the associated pane 62 that is highly transparent to electromagnetic wave energy, as previously noted. Also, the extreme rear end of the partial tube 65 carries an upstanding pin 67, and two elongated longitudinally extending slots or keyways 68 and 69 that are respectively formed in the partial tubes 64 and 65; which elements 67, 68 and 69 are utilized for a purpose more fully explained hereinafter.

In the cooking vessel 50, preferably the pan 51, together with the first tubular member 63 and the partial tube 64 are formed of integral construction, and preferably the cover 53, together with the partial tube 65 are formed of integral construction. For example, the pan 51, together with the elements 63 and 64 may comprise a suitable aluminum alloy casting; and similarly, the cover 53, together with the element 65, may comprise a suitable aluminum alloy casting.

In view of the foregoing description of the cooking vessel 50, it will be understood that in order to assemble the cover 53 upon the pan 51, the cover 53 is placed in an upstanding position about the front thereof, and then the lock element 60 is inserted into the lock elment 59; and then the cover 53 is lowered upon the top of the pan 51 into its closed position with respect to the open top thereof. When the cover 53 is thus assembled upon the top of the pan 51, the annular ridge 58 falls into the annular groove 57 so as to seal the cover 53 with respect to the top of the pan 51, and the partial tube 65 mates the partial tube 64 to define the completely formed second tubular member 66. Of course, the removal of the cover 53 from the top of the pan 51 is effected in a reverse manner, since it will be appreciated that the cover 53 must be hinged upwardly about the front thereof in order to render the lock element 60 disengageable with respect to the lock element 59 by further lifting upwardly upon the cover 53.

Figure 5:
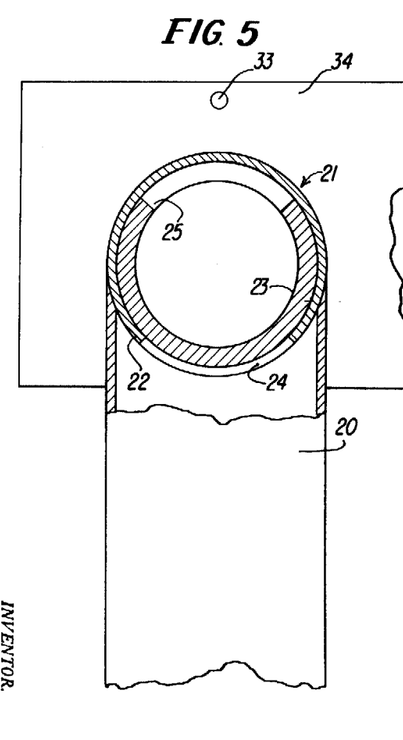
FIG. 5 is an enlarged lateral sectional view of the valve mechanism incorporated in the backsplash of the range and terminating the socket fixture carried thereby, this view being taken in the direction of the arrows along the line 5—5 in FIG. 2.

Referring to FIGS. 2, 5 and 6, the oven 10 further comprises valve mechanism 21 disposed below the top of the backsplash 17 and rearwardly of the front wall thereof; which valve mechanism 21 comprises a substantially semi-cylindrical casing 22 closing the upper end of the wave guide branch 20 and housing a susbtantially cylindrical valve element 23 projecting longitudinally therethrough and mounted for rotation therein. More particularly, the bottom of the valve casing 22 has a valve port 24 formed therein that is adapted selectively to communicate with a valve port 25 formed in the valve element 23. More specifically, the valve element 23 is of tubular configuration, constituting a barrel, the rear end of the barrel 23 projecting through an associated rear opening formed in the rear wall of the casing 22, and the front end of the barrel 23 projecting through an associated front opening formed in the front wall of the casing 22. The rear end of the barrel 23 carries a closing cap 26 disposed adjacent to the rear wall of the casing 22, and the intermediate portion of the barrel 23 carries an annular ring 27 disposed adjacent to the front wall of the casing 22. Further, the front end of the barrel 23 projects forwardly through a front opening provided in the front wall of the backsplash 17 and thence through a substantially cylindrical casing 28 that is carried by the front wall of the backsplash 17. Accordingly, the barrel 23 is mounted for rotation in the two longitudinally aligned casings 22 and 28. The extreme front end of the barrel 23 is open and terminates adjacent to the extreme front end of the casing 28; and the front end of the casing 28 carries a closing cover 29 that is employed for a purpose more fully explained hereinafter.

As best shown in FIGS. 2, 5 and 7, the valve 21 is normally biased into a closed position, and specifically, the barrel 23 is biased normally to close the valve port 24 in the casing 22 by an arrangement including a coil spring 30. More particularly, the central portion of the cap 26 carries a rearwardly projecting stud 31 having a cross slot 32 therein into which one end of the coil spring 30 is secured; and the other end of the coil spring 30 is secured to a rivet 33 that is carried by an enlarged spatula-like element 34 provided on the top of the rear wall of the casing 22. Also, the cap 26 carries a rotatable stop 35 that is rotatable therewith and that cooperates with a fixed stop 36 carried by the spatula 34, thereby positively to establish the closed position of the valve 21. Also, the spatula 34 carries a fixed stop 37 on the opposite side thereof with respect to the fixed stop 36 that cooperates with the rotatable stop 35 carried by the cap 26, thereby positively to establish the open position of the valve 21. Further, a control switch 38 is carried by the fixed stop 37 and is actuated by an associated leaf spring 39, also carried by the stop 37; which leaf spring 39 is engaged by the rotatable stop 35 carried by the cap 26, when the rotatable stop 36 is rotated to engage the fixed stop 37, as the valve 21 is operated into its open position.

In view of the foregoing, it will be understood that the coil spring 30 normally biases the cap 26 in the counterclockwise direction, as viewed in FIG. 7, causing the rotatable stop 35 normally to engage the fixed stop 36, thereby to rotate the barrel 23 so as normally to close the valve port 24 in the casing 22, whereby the valve mechanism 21 is normally biased into its closed position. On the other hand, when the barrel 23 is rotated in the clockwise direction through an angle of approximately 180°, as viewed in FIG. 7, the valve port 25 formed therein is rotated into registry with the valve port 24 formed in the casing 22 so as to operate the valve mechanism 21 into its open position; whereby the cap 26 is rotated with the barrel 23 in the clockwise direction causing ther otatable stop 35 to disengage the fixed stop 36 and to engage the fixed stop 37, with the result that energy is stored in the coil spring 30, and also with the result that the rotatable stop 35 engages the leaf spring 39, causing the same to actuate the control switch 38 out of its normal position for a purpose more fully explained hereinafter. Of course, it will be understood that when the barrel 23 is subsequently released, after operation of the valve mechanism 21 into its open position, that the coil spring 30 automatically restores the valve mechanism 21 into its closed position so that the rotatable stop 35 carried by the cap 26 disengages the fixed stop 37 and re-engages the fixed stop 36 with the result that the rotatable stop 35 disengages the leaf spring 39, so as again to actuate the control switch 38 into its normal position and for a purpose more fully explained hereinafter.

The arrangement of the cap 26 bearing upon the rear wall of the casing 22 and the ring 27 bearing upon the front wall of the casing 22 prevents longitudinal movement of the barrel 23 incident to rotation thereof in the opposite directions as the valve mechanism 21 is selectively rotated between its closed position and its open position, as explained above.

In the arrangement, the completely formed tubular member 66, including the partial tubes 64 and 65 respectively carried by the pan 51 and by the cover 53, constitute a composite plug P carried by the cooking vessel 50; while the casing 28, the cover 29 carried on the extreme front end thereof and the extreme front end of the barrel 23 rotatably mounted in the casing 28, constitute a combination socket S carried by the range 10; and the composite plug P may be readily selectively inserted into and withdrawn from the composite socket S, when the cooking vessel 50 is supported upon the work top 16 by the engagement of the feet 54 carried by the pan 51 with the work top 16. More particularly, as best shown in FIGS. 2 and 4, the cover 29 is arranged so as to accommodate the ready insertion of the composite plug P into the composite socket S. Specifically, a centrally disposed opening 40 is formed in the cover 29; which opening 40 has a notch 41 formed in the top portion thereof and adapted to receive the upstanding pin 67 carried adjacent to the top of the extreme rear end of the partial tube 65; and which opening 40 is provided with two angularly spaced-apart radially inwardly projecting ribs 42 and 43 that are adapted respectively to enter the longitudinally extending grooves 68 and 69 respectively formed in the partial tubes 64 and 65. The arrangement of the notch 41 and the two ribs 42 and 43 in angularly spaced-apart relation with respect to each other keys the cap 29 to the particular composite plug P carried by the cooking vessel 50, so that the particular composite plug P may be readily inserted through the opening 40 provided in the cap 29 and into the composite socket S, but other composite plugs carried by other cooking vessels may not be inserted into the composite socket S, because of the required angular positions of the elements 41, 42 ad 43, as will be readily apparent from FIGS. 2 and 4.

Finally, a longitudinally extending semi-helical groove 44 is formed in the internal surface in the front end of the barrel 23; which groove 44 constitutes a thread that is adapted to receive the upstanding pin 67 carried on the top of the extreme rear portion of the composite plug P. Accordingly, it will be understood that when the composite plug P is inserted into the composite socket S, the pin 67 carried by the composite plug P passes through the notch 41 provided in the top of the centrally disposed opening 40 formed in the cap 29 and enters the top of the groove or thread 44 formed in the internal surface of the front end of the barrel 23; whereby continued movement of the composite plug P rearwardly into the composite socket S toward the backsplash 17 effects cooperation between the pin 67 and the thread 44, so that the barrel 23 is rotated in the counterclockwise direction as viewed from the front of the composite socket S, through an angle of substantially 180°; whereby the valve mechanism 21 is operated from its normally closed position into its open position against the bias of the coil spring 30; whereby electromagnetic wave energy in the wave guide 20 is supplied through the registering valve ports 24 and 25 of the valve mechanism 21 in its open position and thence through the barrel 23 into the socket S and therefrom through the completely formed tubular member 66 of the plug P into the tubular member 63 and therefrom through the pane 62 into the interior of the cooking vessel 50. Accordingly, the electromagnetic wave energy is supplied from the wave guide 20 into the cooking vessel 50, with the cover 53 in its assembled relation with respect to the pan 51, so as to carry out the usual cooking effects in the cooking vessel 50.

Subsequently, when the cooking vessel 50 is moved forwardly with respect to the backsplash 17 in its supported position upon the work top 16, the composite plug P is withdrawn from the composite socket S; whereby this forward movement of the composite plug P causes the pin 67 to ride in the thread 44 so that the barrel 23 is rotated in the counterclockwise direction, as viewed from the front of the composite plug P, with the result that the valve mechanism 21 is again returned into its closed position so as to cut-off the communication between the top of the wave guide 20 and the interior of the barrel 23. Not only is the barrel 23 rotated in the counterclockwise direction, as viewed from the front of the composite socket S, by the cooperation between the pin 67 and the thread 44 as the composite plug P is withdrawn from the composite socket S, but the energy stored in the coil spring 60 also insures this result. In other words, the withdrawal of the composite plug P from the composite socket S not only actuates the valve mechanism 21 from its open position back into its normally closed position, but the coil spring 30 also positively insures that the valve mechanism 21 is operated from its open position back into its normally closed position incident to the withdrawal of the composite plug P from the composite socket S.

Furthermore, it will be appreciated that when the composite plug P carried by the cooking vessel 50 occupies its inserted position with respect to the composite socket S carried by the front of the backsplash 17, it is impossible to remove the cover 53 from its assembled position with respect to the pan 51, since the completely formed tubular member 66 is then inserted within the barrel 23. Thus it is necessary to withdraw the composite plug P completely from the composite socket S in order to render it possible to remove the cover 53 from its assembled position with respect to the top of the pan 51; however, when the composite plug P is withdrawn from the composite socket S, the valve mechanism 21 is positively operated into its closed position; whereby there is no danger of electromagnetic wave energy escaping from the composite socket S to the exterior adjacent to the front of the backsplash 17 of the range 10.

Referring now to FIG. 8, the electric control circuit for the cooking apparatus is there illustrated and comprises a source of electric power including a pair of line conductors 80 and 81, the line conductor 80 being indicated as being grounded. Also a door switch 82 is incorporated in the range 10 and governed by the position of the front door 14, the door switch 82 being operated into its respective open and closed positions in response to corresponding movements of the front door 14 into its open and closed positions, respectively. Further, the backsplash 17 of the oven 10 carries a manually settable master timer switch 83 that includes a set of switch springs 84; the master timer switch 83 may be manually set out of its off position into a variable time position; whereby the set of switch springs 84 is closed. Thereafter, the master timer switch 83 is automatically operated back into its off position after the expiration of a time interval corresponding to that preset thereon; whereby the set of switch springs 84 is again operated into its open position. Also the back-splash 17 of the oven 10 carries a selector switch 85 including a manually operable dial 86, a wiper 87 and two contacts 88 and 89 respectively corresponding to the oven cavity 13 and to the cooking vessel 50. The manual dial 86 may be selectively operated from an off position, wherein the wiper 87 disengages both of the contacts 88 and 89, selectively into a cooking vessel position, a combination cooking vessel and oven cavity position, and an oven cavity position. In the cooking vessel position of the selector switch 85, the wiper 87 engages only the contact 88; in the combination cooking vessel and oven cavity position, the wiper 87 engages both of the contacts 88 and 89; and in the oven cavity position, the wiper 87 engages only the contact 89.

The line conductor 80 is connected to one terminal of the oscillator 18; and the line conductor 81 is connected to one of the springs of the door switch 82, the other spring of the door switch 82 being connected to a conductor 90. The conductor 90 is connected to one spring of the set 84; and the other spring of the set 84 is connected to the wiper 87 of the selector switch 85. The contacts 88 and 89 of the selector switch 85 are respectively connected to two conductors 91 and 92. Also the conductor 91 is commonly connected to the other terminal of the oscillator 18 and to one of the springs of the control switch 38; and the other spring of the control switch 88 is connected to the conductor 92.

Considering now the general mode of operation of the cooking apparatus to carry out a cooking operation in the oven cavity 13, the selector switch 85 is operated into its cavity position, whereby the wiper 87 engages the contact 88. The master timer 83 is then set to close the switch springs 84, whereby an obvious circuit is completed for operating the oscillator 18, assuming that the door switch 82 occupies its closed position by virtue of the closed position of the front door 14. The oscillator 18 supplies electromagnetic wave energy into the wave guide 19 and consequently into the oven cavity 13 for the cooking purpose. Also, the electromagnetic wave energy in the wave guide 19 proceeds into the wave guide 20, but since the valve mechanism 21 occupies its closed position, the electromagnetic wave energy does not escape through the composite socket S to the exterior. The cooking operation in the oven cavity 13 proceeds throughout the preset time interval, whereupon the master timer 83 returns the switch springs 84 into their open position so as to interrupt the above-traced circuit for operating the oscillator 18, thereby to terminate the cooking operation in the oven cavity 13.

Considering now the operation of the cooking apparatus to carry out a cooking operation in the cooking vessel 50, the selector switch 85 is operated into its cooking vessel position; whereby the wiper 87 engages the contact 89. The food to be cooked is placed in the cooking vessel 50 and the cover 53 is assembled upon the top of the pan 51, thereby to produce the composite plug P. The cooking vessel 50 is then supported upon the work top 16 and is moved rearwardly to cause the composite plug P to be inserted into the composite socket S; whereby the valve mechanism 21 is operated into its open position and the control switch 38 is operated into its closed position. The master timer 83 is then set to close the switch springs 84, whereby an alternative circuit is completed for operating the oscillator 18, this circuit extends between the line conductor 81 via the closed door switch 82, the conductor 90, the closed set of switch springs 84, the wiper 87 and the engaged contact 89, the conductor 92 and the closed control switch 38 to the conductor 91 and thence to the ungrounded terminal of the oscillator 18. The oscillator 18 supplies electromagnetic wave energy into the wave guide 19 and thus into the oven cavity 13; however, without effect in the present case. Also, the electromagnetic wave energy in the wave guide 19 proceeds through the wave guide 20 and thence through the valve mechanism 21 in its open position and into the composite socket S and thence through the composite plug P and through the pane 62 into the cooking vessel 50 for the cooking purpose.

The cooking operation in the cooking vessel 50 proceeds through the preset time interval, whereupon the master timer 83 returns the switch springs 84 into their open position so as to interrupt the above-traced alternative circuit for operating the oscillator 18, thereby to terminate the cooking operation in the cooking vessel 50.

In the carrying out of simultaneous cooking operations both in the oven cavity 13 and in the cooking vessel 50, the selector switch 85 is operated into its combination oven cavity and cooking vessel position so as to cause the wiper 87 to engage both of the contacts 88 and 89. The remainder of the operations are the same as that previously described and the cooking operations proceed under the control of the master timer 83, in the manner previously explained.

It is pointed out that the door switch 82 occupies a master position in the control circuit for the oscillator 18; whereby opening of the front door 14 effects opening of the door switch 82 and the consequent arresting of operation of the oscillator 18 independently of the master timer switch 83. This arrangement insures complete safety of the oven 10 against the escape of electromagnetic wave energy from the oven cavity 13 through the front access opening thereinto, when the front door 14 is moved into its open position, and regardless of whether the cooking operation that is in progress at the time involves the oven cavity 13 or the cooking vessel 50, since in any case operation of the oscillator 18 causes electromagnetic wave energy to be supplied to the oven cavity 13.

Also, it is pointed out in connection with the carrying out of a cooking operation in the cooking vessel 50, that the same may be terminated at any time by the withdrawal of the composite plug P from the composite socket S and independently of the master timer 83. More particularly in this case, the withdrawal of the composite plug P from the composite socket S not only effects the return of the valve mechanism 21 from its open position back into its closed position as previously explained, but also the control switch 38 is opened, thereby to interrupt the previously traced alternative circuit for operating the oscillator 18. Accordingly, when the selector switch 85 occupies its cooking vessel position, not only must the front door 14 be maintained in its closed position, but also the composite plug P must be maintained in its inserted position in the composite socket S in order to render the control of the oscillator 18 under the master timer 83.

In view of the foregoing, it is apparent that there has been provided cooking apparatus comprising a range including a body having an oven cavity therein, a first fixture carried by the range body, a portable cooking vessel, a second fixture carried by the portable cooking vessel, wherein the first and second fixtures are selectively connectible and disconnectible with respect to each other when the cooking vessel is carried by the range body, and an oscillator selectively operative to supply electromagnetic wave energy in the ultra-high frequency band to the oven cavity, and also to the cooking vessel when the first and second fixtures are connected together. Also, there has been provided an improved arrangement of valve mechanism in the connection between the oscillator and the first fixture, wherein the valve mechanism is selectively operated between its closed and open positions respectively in response to connection and to disconnection of the second fixture with respect to the first fixture. Moreover, there has been provided an improved control arrangement, whereby operation of the oscillator is selectively initiated and arrested respectively in response to connection and disconnection of the second fixture with respect to the first fixture. Further, there has been provided a cooking vessel of improved construction and arrangement and including a pan provided with a side wall having an open top and a removable cover, wherein the second fixture mentioned comprises complementary parts respectively carried by the pan and by the cover, so that the second fixture is completed only when the cover occupies its assembled position with respect to the pan closing the open top thereof, and wherein the connection and the disconnection of the completed second fixture with respect to the first fixture is effective selectively to operate the valve mechanism and selectively to operate the oscillator. Finally, there has been provided in a cooking vessel including a pan provided with a side wall having an open top, a removable cover for the open top of the pan, a tubular member carried by the side wall in surrounding relation with respect to an opening provided therein, and a pane arranged in the tubular member in covering relation with respect to the opening and sealed to the portion of the side wall surrounding the opening so as to prevent the escape of food from the pan into the tubular member, wherein the tubular member serves as a conduit for supplying electromagnetic wave energy into the pan, and wherein the pane is formed of material that is highly transparent to electromagnetic wave energy and characterized by both low absorption and low reflection of electromagnetic wave energy.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Cooking apparatus comprising a wave guide, an oscillator for supplying electromagnetic wave energy into said wave guide, a first fixture, a connection between said wave guide and said first fixture, a valve included in said connection and having open and closed positions, whereby electromagnetic wave energy may be supplied from said wave guide via said connection to said first fixture only when said valve occupies its open position, a portable cooking vessel carrying a second fixture, said second fixture being selectively connectible to said first fixture, whereby electromagnetic wave energy may be supplied from said first fixture via said second fixture into said cooking vessel when said second fixture is connected to said first fixture, and means responsive to connection of said second fixture to said first fixture for operating said valve into its open position and responsive to disconnection of said second fixture from said first fixture for operating said valve into its closed position.

2. Cooking apparatus comprising a wave guide, an oscillator for supplying electromagnetic wave energy into said wave guide, a support, a first fixture carried by said support, a connection between said wave guide and said first fixture, a valve included in said connection and having open and closed positions, whereby electromagnetic wave energy may be supplied from said wave guide via said connection to said first fixture only when said valve occupies its open position, a portable cooking vessel removably carried by said support, said cooking vessel carrying a second fixture, said second fixture being readily selectively connectible and disconnectible with respect to said first fixture when said cooking vessel is carried by said support, whereby electromagnetic wave energy may be supplied from said first fixture via said second fixture into said cooking vessel when said cooking vessel is carried by said support and when said second fixture is connected to said first fixture, and means responsive to connection of said second fixture to said first fixture for operating said valve into its open position and responsive to disconnection of said second fixture from said first fixture for operating said valve into its closed position.

3. The cooking apparatus set forth in claim 2, wherein said first fixture is in the form of a socket, said second fixture is in the form of a plug, and said plug may be readily selectively inserted into said socket and withdrawn therefrom when said cooking vessel is carried by said support.

4. Cooking apparatus comprising a wave guide, an oscillator operative to supply electromagnetic wave energy into said wave guide, a first fixture, a connection between said wave guide and said first fixture, a valve included in said connection and having open and closed positions, whereby electromagnetic wave energy may be supplied from said wave guide via said connection to said first fixture only when said valve occupies its open position, a portable cooking vessel carrying a second fixture, said second fixture being selectively connectible to said first fixture, whereby electromagnetic wave energy may be supplied from said first fixture via said second fixture into said cooking vessel when said second fixture is connected to said first fixture, and means responsive to connection of said second fixture to said first fixture for operating said valve into its open position and for initiating operation of said oscillator and responsive to disconnection of said second fixture from said first fixture for operating said valve into its closed position and for arresting operation of said oscillator.

5. Cooking apparatus comprising a wave guide, an oscillator operative to supply electromagnetic wave energy into said wave guide, a first fixture, a connection between said wave guide and said first fixture, a valve included in said connection and having open and closed positions, whereby electromagnetic wave energy may be supplied from said wave guide via said connection to said first fixture only when said valve occupies its open position, a portable cooking vessel carrying a second fixture, said second fixture being selectively connectible to said first fixture, whereby electromagnetic wave energy may be supplied from said first fixture via said second fixture into said cooking vessel when said second fixture is connected to said first fixture, means responsive to connection of said second fixture to said first fixture for operating said valve into its open position and responsive to disconnection of said second fixture from said first fixture for operating said valve into its closed position, and means responsive to operation of said valve into its open position for initiating operation of said oscillator and responsive to operation of said valve into its closed position for arresting operation of said oscillator.

6. Cooking apparatus comprising a wave guide, an oscillator for supplying electromagnetic wave energy into said wave guide, a socket, a connection between said wave guide and said socket, a valve included in said connection and having open and closed positions, whereby electromagnetic wave energy may be supplied from said wave guide via said connection to said socket only when said valve occupies its open position, a portable cooking vessel carrying a plug, said plug being selectively insertable into said socket, whereby electromagnetic wave energy may be supplied from said socket via said plug into said cooking vessel when said plug is inserted into said socket, means normally biasing said valve into its closed position, and means responsive to insertion of said plug into said socket for operating said valve against said biasing means into its open position, whereby said valve is returned by said biasing means back into its closed position in response to withdrawal of said plug from said socket.

7. Cooking apparatus comprising a wave guide, an oscillator for supplying electromagnetic wave energy into said wave guide, a first fixture, a connection between said wave guide and said first fixture, a valve included in said connection and having open and closed positions, whereby electromagnetic wave energy may be supplied from said wave guide via said connection to said first fixture only when said valve occupies its open position, a portable cooking vessel including a pan having an open top and provided with a removable cover, a second fixture including first and second complementary elements respectively carried by said pan and by said cover, whereby said second fixture is completely formed only when said cover is assembled upon said pan in covering relation with respect to the open top thereof, said completely formed second fixture being selectively connectible to said first fixture, whereby electromagnetic wave energy may be supplied from said first fixture via said completely formed second fixture into said cooking vessel when said completely formed second fixture is connected to said first fixture, means normally biasing said valve into its closed position, and actuating means responsive only to connection of said completely formed second fixture to said first fixture for operating said valve against said biasing means into its open position, whereby said valve is returned by said biasing means back into its closed position in response to disconnection of said completely formed second fixture from said first fixture.

8. Cooking apparatus comprising a wave guide, an oscillator operative to supply electromagnetic wave energy into said wave guide, a first fixture connected to said wave guide, a portable cooking vessel including a pan having an open top and provided with a removable cover, a second fixture including first and second complementary elements respectively carried by said pan and by said cover, whereby said second fixture is completely formed only when said cover is assembled upon said pan in covering relation with respect to the open top thereof, said completely formed second fixture being selectively connectible to said first fixture, whereby electromagnetic wave energy may be supplied from said first fixture via said completely formed second fixture into said cooking vessel when said completely formed second fixture is connected to said first fixture, and actuating means responsive only to connection of said completely formed second fixture to said first fixture for initiating operation of said oscillator and responsive to disconnection of said completely formed second fixture from said first fixture for arresting operation of said oscillator.

9. Cooking apparatus comprising a wave guide, an oscillator operative to supply electromagnetic wave energy into said wave guide, a first fixture, a connection between said wave guide and said first fixture, a valve included in said connection and having open and closed positions, whereby electromagnetic wave energy may be supplied from said wave guide via said connection to said first fixture only when said valve occupies its open position, a portable cooking vessel including a pan having an open top and provided with a removable cover, a second fixture including first and second complementary elements respectively carried by said pan and by said cover, whereby said second fixture is completely formed only when said cover is assembled upon said pan in covering relation with respect to the open top thereof, said completely formed second fixture being selectively connectible to said first fixture, whereby electromagnetic wave energy may be supplied from said first fixture via said completely formed second fixture into said cooking vessel when said completely formed second fixture is connected to said first fixture, means normally biasing said valve into its closed position, first actuating means responsive only to connection of said completely formed second fixture to said first fixture for operating said valve against said biasing means into its open position, whereby said valve is returned by said biasing means back into its closed position in response to disconnection of said completely formed second fixture from said first fixture, and second actuating means responsive to operation of said valve into its open position for initiating operation of said oscillator and responsive to operation of said valve into its closed position for arresting operation of said oscillator.

10. Cooking apparatus comprising a wave guide, an oscillator for supplying electromagnetic wave energy into said wave guide, a socket connection between said wave guide and said socket, a valve included in said connection and having open and closed positions, whereby electromagnetic wave energy may be supplied from said wave guide via said connection to said socket only when said valve occupies its open position, a portable cooking vessel including a pan having an open top and provided with a removable cover, a plug including first and second complementary elements respectively carried by said pan and by said cover, whereby said plug is completely formed only when said cover is assembled upon said pan in covering relation with respect to the open top thereof, means including complementary first and second key parts respectively carried by said socket and by said completely formed plug for accommodating ready selective insertion of said plug into said socket, whereby electromagnetic wave energy may be supplied from said socket via said completely formed plug into said cooking vessel when said completely formed plug is inserted into said socket, means normally biasing said valve into its closed position, and actuating means responsive only to insertion of said completely formed plug into said socket for operating said valve against said biasing means into its open position, whereby said valve is returned by said biasing means back into its closed position in response to withdrawal of said completely formed plug from said socket.

11. The cooking apparatus set forth in claim 10, and further comprising complementary first and second latch parts respectively carried by said pan and by said cover for preventing removal of said cover from the open top of said pan when said completely formed plug occupies its inserted position in said socket.

12. A portable cooking vessel comprising a metal pan provided with a side wall and having an open top, a removable metal cover for the open top of said pan, a first tubular metal member carried by said side wall and surrounding an opening provided therein, a second tubular member including first and second complementary metal elements respectively carried by said first tubular member and by said cover, whereby said second tubular member is completely formed only when said cover is assembled upon said pan in covering relation with respect to the open top thereof, said completely formed second tubular member communicating with said first tubular member, said first tubular member and said communicating completely formed second tubular member being adapted to serve as a composite conduit for supplying electromagnetic wave energy therefrom through said opening into said vessel, and a pane arranged in covering relation with said opening and sealed to the surrounding portion of said side wall so as to prevent the escape of food from said vessel through said opening into said first tubular member, said pane being formed of material that is highly transparent to electromagnetic wave energy to prevent substantial absorption or reflection of electromagnetic wave energy thereby.

13. Cooking apparatus comprising a body defining an oven cavity having a front access opening thereinto, a front door carried by the front of said body and operatively associated with said front access opening and selectively movable between open and closed positions with respect thereto, a work top carried by the top of said body, a backsplash carried by the top rear portion of said body adjacent to the rear of said work top, a first fixture carried by said backsplash, a wave guide commonly communicating with said oven cavity and with said first fixture, an oscillator operative to supply electromagnetic wave energy into said wave guide and therefrom into said oven cavity and into said first fixture, a portable cooking vessel removably carried by said work top, said cooking vessel carrying a second fixture, said second fixture being readily selectively connectible and disconnectible with respect to said first fixture when said cooking vessel is carried by said work top, whereby electromagnetic wave energy may be supplied from said first fixture via said second fixture into said cooking vessel when said cooking vessel is carried by said work top and when said second fixture is connected to said first fixture, a manually operable switch, first control means governed jointly by said manually operable switch and by said front door in its closed position for operating said oscillator, and second control means governed jointly by the connection of said second fixture to said first fixture and by said manually operable switch and by said front door in its closed position for operating said oscillator.

14. Cooking apparatus comprising a body defining an oven cavity having a front access opening thereinto, a front door carried by the front of said body and operatively associated with said front access opening and selectively movable between open and closed positions with respect thereto, a work top carried by the top of said body, a backsplash carried by the top rear portion of said body adjacent to the rear of said work top, a first fixture carried by said backsplash, a wave guide communicating with said oven cavity, a connection between said wave guide and said first fixture, a valve included in said connection and having open and closed positions, an oscillator operative to supply electromagnetic wave energy into said wave guide and therefrom into said oven cavity and into said connection, whereby electromagnetic wave energy may be supplied from said connection to said first fixture only when said valve occupies its open position, a portable cooking vessel removably carried by said work top, said cooking vessel carrying a second fixture, said second fixture being readily selectively connectible and disconnectible with respect to said first fixture when said cooking vessel is carried by said work top, whereby electromagnetic wave energy may be supplied from said first fixture via said second fixture into said cooking vessel when said cooking vessel is carried by said work top and when said second fixture is connected to said first fixture, means responsive to connection of said second fixture to said first fixture for operating said valve into its open position and responsive to disconnection of said second fixture from said first fixture for operating said valve into its closed position, a manually operable switch, first control means governed jointly by said manually operable switch and by said front door in its closed position for operating said oscillator, and second control means governed jointly by said valve in its open position and by said manually operable switch and by said front door in its closed position for operating said oscillator.

15. Cooking apparatus comprising an upstanding body, a work top carried by the top of said body, a backsplash carried by the top rear portion of said body adjacent to the rear of said work top, a first fixture carried by said backsplash, a wave guide communicating with said first fixture, an oscillator operative to supply electromagnetic wave energy into said wave guide and therefrom into said first fixture, a portable cooking vessel removably carried by said work top, said cooking vessel carrying a second fixture, said second fixture being readily selectively connectible and disconnectible with respect to said first fixture when said cooking vessel is carried by said work top, whereby electromagnetic wave energy may be supplied from said first fixture via said second fixture into said cooking vessel when said cooking vessel is carried by said work top and when said second fixture is connected to said first fixture, and means responsive to connection of said second fixture to said first fixture for initiating operation of said oscillator and responsive to disconnection of said second fixture from said first fixture for arresting operation of said oscillator.

16. A portable cooking vessel comprising an imperforate metal pan provided with a bottom wall and an upstanding surrounding side wall having an open top, a removable metal cover for the open top of said side wall, an outwardly projecting tubular metal member carried by said side wall and surrounding an upstanding opening provided therein, said tubular member being adapted to serve as a conduit for supplying electromagnetic wave energy therefrom through said opening into said vessel, and an upstanding pane arranged in covering relation with said opening and sealed to the surrounding portion of said side wall so as to prevent the escape of food from said vessel through said opening into said tubular member, said pane being formed of material that is highly transparent to electromagnetic wave energy to prevent substantial absorption or reflection of electromagnetic wave energy thereby.

17. The portable cooking vessel set forth in claim 16, wherein said pane is formed essentially of glass.

References Cited in the file of this patent
UNITED STATES PATENTS

| | | |
|---|---|---|
| 2,622,187 | Welch | Dec. 16, 1952 |
| 2,919,336 | Hahn | Dec. 29, 1959 |
| 2,993,973 | Johnson et al. | July 25, 1961 |

UNITED STATES PATENT OFFICE

CERTIFICATE OF CORRECTION

Patent No. 3,083,284                      March 26, 1963

Harris P. Kamide

It is hereby certified that error appears in the above numbered patent requiring correction and that the said Letters Patent should read as corrected below.

Column 12, line 40, after "socket" insert -- , a --;

Signed and sealed this 8th day of October 1963.

(SEAL)
Attest:

ERNEST W. SWIDER
Attesting Officer

EDWIN L. REYNOLDS

Acting Commissioner of Patents